(12) United States Patent
Fuchs et al.

(10) Patent No.: US 9,845,119 B2
(45) Date of Patent: Dec. 19, 2017

(54) ATTACHMENT PART, SPOILER ARRANGEMENT AND MOTOR VEHICLE

(71) Applicant: GM GLOBAL TECHNOLOGY OPERATIONS LLC, Detroit, MI (US)

(72) Inventors: Michael Fuchs, Alzey-Weinheim (DE); Friedrich Hein, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 14/951,080

(22) Filed: Nov. 24, 2015

(65) Prior Publication Data

US 2016/0152287 A1 Jun. 2, 2016

(30) Foreign Application Priority Data

Nov. 27, 2014 (DE) ........................ 10 2014 017 606

(51) Int. Cl.
*B62D 35/00* (2006.01)

(52) U.S. Cl.
CPC ......... *B62D 35/007* (2013.01); *B62D 35/005* (2013.01); *B62D 35/008* (2013.01)

(58) Field of Classification Search
CPC ... B62D 35/007; B62D 35/005; B62D 35/008
USPC ..................................... 296/180.1, 181.5, 29
See application file for complete search history.

(56) References Cited

U.S. PATENT DOCUMENTS

| | | | | |
|---|---|---|---|---|
| 4,652,036 A * | 3/1987 | Okamoto | ............ | B62D 35/007 244/123.1 |
| 7,399,024 B2 * | 7/2008 | Ordonio, Jr. | ......... | B62D 35/007 296/180.1 |
| 8,020,905 B2 * | 9/2011 | Nakayama | ............. | B60R 13/04 293/115 |
| 8,113,465 B2 * | 2/2012 | McAlinden | ............. | B64C 3/185 244/123.1 |
| 8,356,856 B2 * | 1/2013 | Danev | .................. | B62D 35/005 296/180.1 |
| 8,579,356 B2 * | 11/2013 | Turner | ................. | B62D 35/005 296/180.1 |
| 9,187,138 B2 * | 11/2015 | Newberry | ............ | B62D 35/007 |

FOREIGN PATENT DOCUMENTS

DE 102009060868 A1 7/2011

OTHER PUBLICATIONS

German Patent Office, German Search Report for German Application No. 102014017606.1, dated Nov. 27, 2015.

* cited by examiner

*Primary Examiner* — Jason S Morrow
*Assistant Examiner* — E Turnerhicks
(74) *Attorney, Agent, or Firm* — Lorenz & Kopf, LLP

(57) ABSTRACT

An aerodynamically effective attachment part or spoiler extension is disclosed. The spoiler extension includes a guide arrangement having a first guide element formed between the spoiler extension and a base body of the spoiler arrangement. Transfer of the spoiler extension is guided from a release position, in which the spoiler extension is detachable from the base body, along at transfer direction into a locking position, in which the spoiler extension is secured on the base body. The spoiler extension includes a securing element able to secure the spoiler extension automatically on the base body of the spoiler arrangement in the locking position.

16 Claims, 3 Drawing Sheets

ATTACHMENT PART, SPOILER ARRANGEMENT AND MOTOR VEHICLE

CROSS-REFERENCE TO RELATED APPLICATION

This application claims priority to German Application No. 102014017606.1, filed Nov. 27, 2014, which is incorporated herein by reference in its entirety.

TECHNICAL FIELD

The present disclosure pertains to an aerodynamically effective attachment part for a spoiler arrangement, in particular a rear spoiler, of a motor vehicle, to a spoiler arrangement with such an attachment part and to a motor vehicle with such an attachment part and/or with such a spoiler arrangement.

BACKGROUND

Spoiler arrangements are known for motor vehicles, in order to reduce the lift of the motor vehicle at high speeds, whereby the contact pressure of the motor vehicle onto the ground can be increased and a transfer of forces from the motor vehicle to the ground is increased compared to motor vehicles without a spoiler arrangement. As a result, the driving stability may be increased, and the braking distance at high speeds may be reduced.

Known spoiler arrangements extend over the entire width of the vehicle and are received at corresponding mounts on the motor vehicle that requires manufacturing tolerances to be kept small, which entails relatively high cost expenditure.

DE 10 2009 060 868 A1 discloses a rear spoiler attached to a base support by means of fastening bolts.

SUMMARY

In accordance with the present disclosure, an attachment part for a spoiler arrangement and a spoiler arrangement with such a spoiler extension is disclosed having a simplified means of securing the spoiler extension to a base body of the spoiler. In particular, an aerodynamically effective attachment part or in other words a spoiler extension includes a directing body having at least one surface for changing the flow behavior of the air flowing along the surface. A guide arrangement includes a first guide element formed between the spoiler extension and the base body of the spoiler arrangement. A transfer of the spoiler extension is able to be guided from a release position, in which the spoiler extension is removable from the base body, along at least one transfer direction into a locking position. The spoiler extension is able to be secured on the base body with a fastening element, by which the directing body at least in the locking position is able to be secured automatically on the base body of the spoiler arrangement. The aerodynamic spoiler extension can be a rear spoiler of a motor vehicle. Furthermore, the spoiler extension can also include an accessory part for a rear spoiler.

The installation is simplified through the fact that the directing body is able to be secured automatically to the base body of the spoiler arrangement in the locking position. In particular, separate fasteners are not used, whereby the installation of the directing body on the base body is reduced with regard to components.

The first joining element can basically be formed in any desired manner, as long as it fulfils the function of guiding the directing body from the release position into the locking position. In an embodiment of the spoiler extension, provision is made that at least one first guide element includes a projection section having a T-shaped or double-T-shaped cross-section transversely to the transfer direction, and with which a corresponding second guide element of the guide arrangement is constructed in a complementary manner to the first guide element, arranged on the base body, and is able to be engaged behind transversely to the transfer direction.

Furthermore, it proves to be advantageous when the first guide element is secured detachably or non-detachably on the directing body, in particular when the first guide element and the directing body include a shared or common component. When the first guide element is able to be secured detachably on the directing body, the directing body can be secured to a plurality of different base bodies. In this way, the usability of the spoiler extension is extended. When the first guide element and the directing body include a shared component, the spoiler extension is able to be produced simply and economically, and the installation is facilitated.

In order to reduce a certain play between the first guide element and the second guide element, it proves to be advantageous when the spoiler extension includes at least one clamping element, which is secured on the directing body, in particular forming a shared component with the directing body, by which a force acting transversely or obliquely to the transfer direction, in particular a tensile force or compressive force, is able to be built up between base body and directing body.

In order to alter the aerodynamic behavior of the directing body, an adjusting element is provided, by which an angle of inclination of the directing body is able to be adjusted with respect to the base body. The adjusting element can be realized simply and economically when the at least one adjusting element includes a surface shaping on the first guide element, on the second guide element and/or on the clamping element, in particular a section inclined with respect to the transfer direction.

The securing element can basically be constructed in any desired manner, in so far as it fulfils the function of automatically securing the directing body on the base body in the locking position. The securing element can be produced simply and economically when the securing element includes a detent section extended transversely or obliquely to the transfer direction, which detent section, on transferring from the release position into the locking position is able to be displaced transversely or obliquely to the transfer direction and which at least on reaching the locking position automatically engages behind a recess in the base body transversely to the transfer direction.

On transferring of the directing body from the release position into the locking position, in such a case the securing element is displaced away from the base body. On reaching the locking position, the securing element, which is tensioned in such a way, is automatically returned through the stored tension into the non-deflected position. Here, the detent section engages behind a recess in the base body.

Basically, it is conceivable that the detent section is constructed so as to be conical and is movable by means of a spring transversely to the transfer direction. The spring automatically returns the detent section into the non-displaced position as soon as the detent section is unstressed. The securing element can be realized in a simple manner when the securing element includes a flexible holding section which is prestressed into the locking position, at one end of which the detent section is arranged, in order to form with the holding section an L-shaped cross-section, and which is able to be secured on the directing body by the other end.

Basically, the spoiler extension can include any desired number of guide element, securing element and clamping element. In an embodiment of the spoiler extension, provision is made that the spoiler extension includes at least two guide element, extended in particular parallel to each other, at least one securing element arranged between the at least two guide element, and at least one clamping element arranged to the securing element and guide element.

In another embodiment, a spoiler arrangement, in particular a rear spoiler, for a motor vehicle, is provided with at least one base body arranged on the motor vehicle and includes at least one aerodynamically effective attachment part or spoiler extension. The spoiler extension includes at least one directing body having at least one surface for changing the flow behavior of the air flowing along the surface. At least a first guide element of a guide arrangement is formed between the spoiler extension and the base body. A transfer of the spoiler extension is able to be guided from a release position, in which the spoiler extension is removable from the base body, along at least one transfer direction into a locking position, in which the spoiler extension is secured on the base body. The spoiler extension includes at least one securing element for securing the directing body automatically on the base body at least in the locking position. Basically, it is conceivable that the base body is formed from the vehicle body. In addition, it is conceivable that the base body is able to be secured as a detachable individual component on the vehicle body.

It proves to be advantageous when the guide arrangement includes a second guide element, which is constructed in a corresponding complementary manner to the first guide element and arranged on the base body detachably or non-detachably, in particular forming a shared component with the base body, and which is able to be engaged behind by the first guide element transversely to the transfer direction and in particular is constructed in the manner of a rail.

Furthermore, in an example embodiment of a spoiler arrangement, at least one adjusting element is provided, by which an angle of inclination of the directing body with respect to the base body is able to be adjusted, and which in particular includes a surface shaping on the second guide element, in particular a section inclined with respect to the transfer direction.

In addition, it proves to be advantageous when the spoiler arrangement includes at least one recess in the base body, in which the securing element of the spoiler extension is able to be arranged at least in the locking position.

In addition, a spoiler arrangement proves to be advantageous when the guide arrangement has at least two second guide element, extended substantially parallel to one another, and has at least one recess arranged between the two guide elements. Finally, at least one spoiler arrangement is provided with at least one of the previously mentioned features, and with at least one aerodynamically effective spoiler extension, with at least one of the previously mentioned features.

The aerodynamically effective spoiler extension, the spoiler arrangement and the motor vehicle prove to be advantageous in several aspects. Through the fact that the aerodynamic spoiler extension includes a securing element, by which the directing body of the spoiler extension is able to be secured automatically on the base body of the spoiler arrangement at least in the locking position, the installation of the spoiler arrangement is facilitated. Moreover, through the fact that the aerodynamically effective spoiler extension includes at least one guide element, the installation of the directing body on the base body is facilitated.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The figures show a spoiler arrangement provided as a whole with the reference number 2, in particular a rear spoiler, for a motor vehicle (only partially illustrated in the figures). The spoiler arrangement 2 includes a base body 4, which is able to be secured on the body of the motor vehicle. Furthermore, the spoiler arrangement 2 has an aerodynamically effective spoiler extension 6, which is able to be secured on the base body 4.

Figure 1:
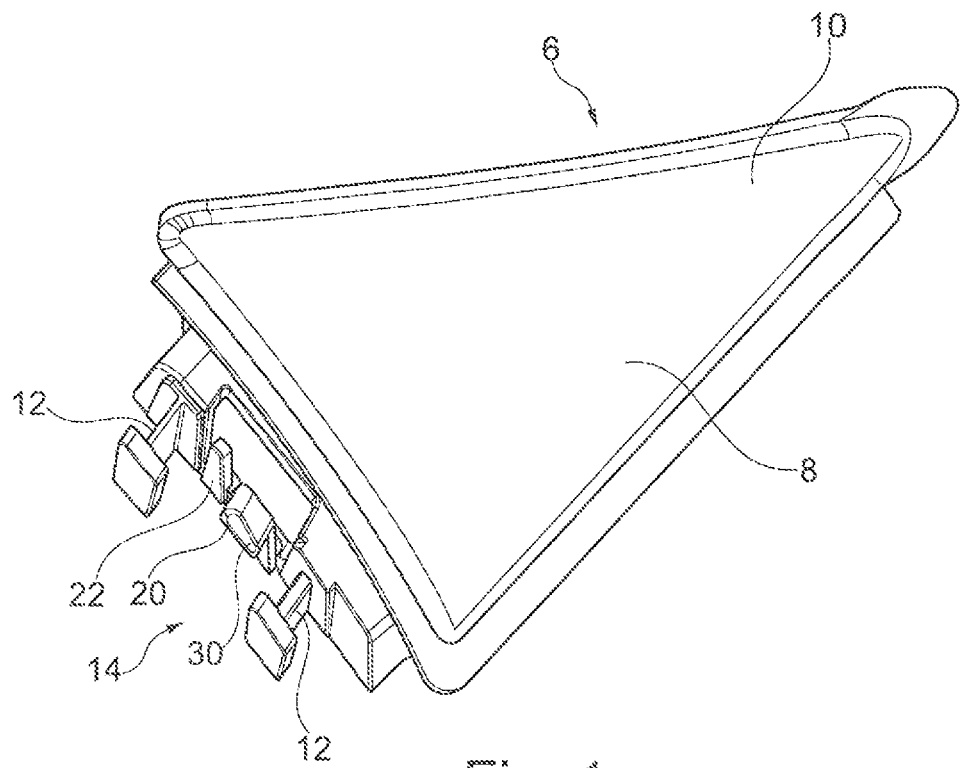
FIG. 1 shows a perspective top view onto an aerodynamically effective spoiler extension of a spoiler arrangement.

FIG. 1 shows a perspective top view onto an aerodynamically effective spoiler extension 6. The latter includes a directing body 8, which includes at least one surface 10, by which the flow behavior of the air flowing along the surface 10 is able to be changed. In the example embodiments of the spoiler extension 6 shown in the figures, the spoiler extension 6 includes two first guide elements 12 of a guide arrangement 14. The first guide element 12 of the guide arrangement 14 are constructed such that they can engage behind the second guide element 16 of the base body 4.

The second guide elements 16 of the base body 4 are engaged behind by the first guide elements 12 of the spoiler extension 6 such that a transfer of the directing body 8 is able to be guided from a release position, in which the spoiler extension 6 is able to be removed from the base body 4, along at least one transfer direction 18 into a locking position, in which the spoiler extension 6 is secured on the base body 4.

Furthermore, the example embodiment of the spoiler extension 6 which can be seen from FIG. 1 includes a securing element 20, by which the directing body 8 at least in the locking position is able to be secured automatically on the base body 4 of the spoiler arrangement 2. Furthermore, the spoiler extension 6 includes a clamping element 22, by which a force acting transversely or obliquely to the transfer direction 18 is generated between the base body 4 and the directing body 6.

Figure 2:
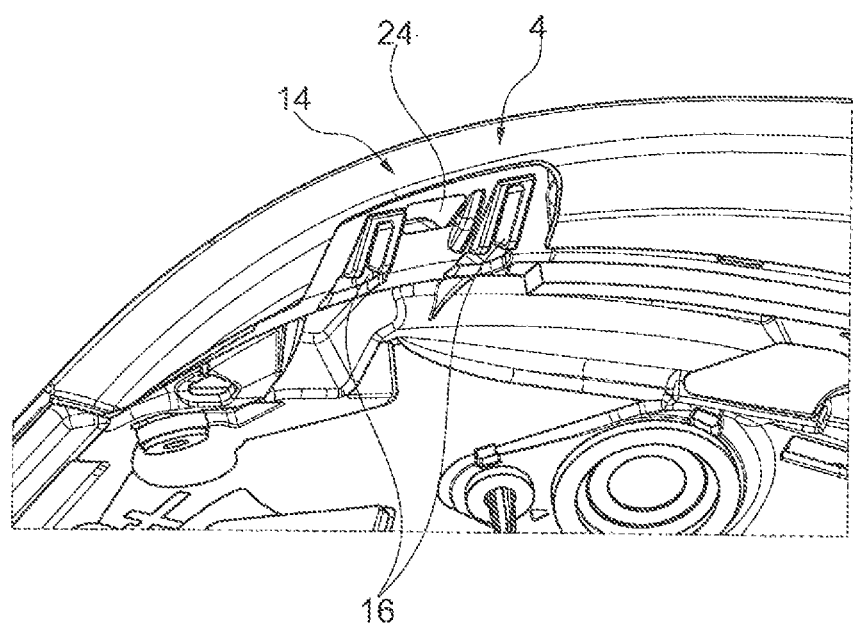
FIG. 2 shows a perspective side view onto a base body of the spoiler arrangement.

FIG. 2 shows a perspective side view onto the base body 4, which includes two second guide element 16. Furthermore, the base body 4 includes a recess 24, into which the securing element 20 of the spoiler extension 6 is able to be engaged at least in the locking position.

Figure 3:
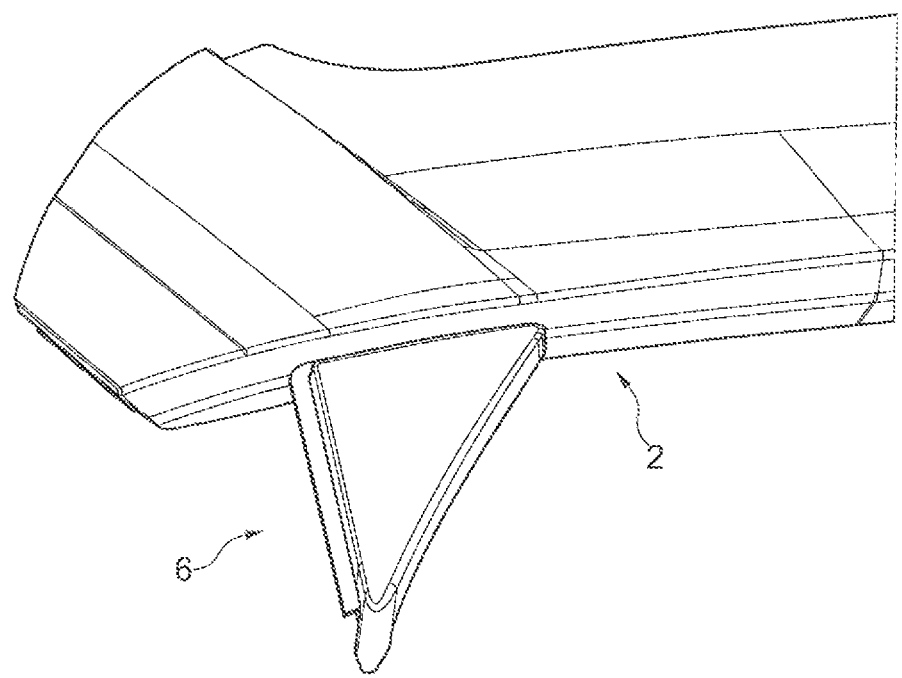
FIG. 3 shows the aerodynamic spoiler extension according to FIG. 1 in an installed arrangement.

FIG. 3 shows a top view onto the spoiler arrangement 2, in which the spoiler extension 6 is joined to the base body 4.

Figure 4:
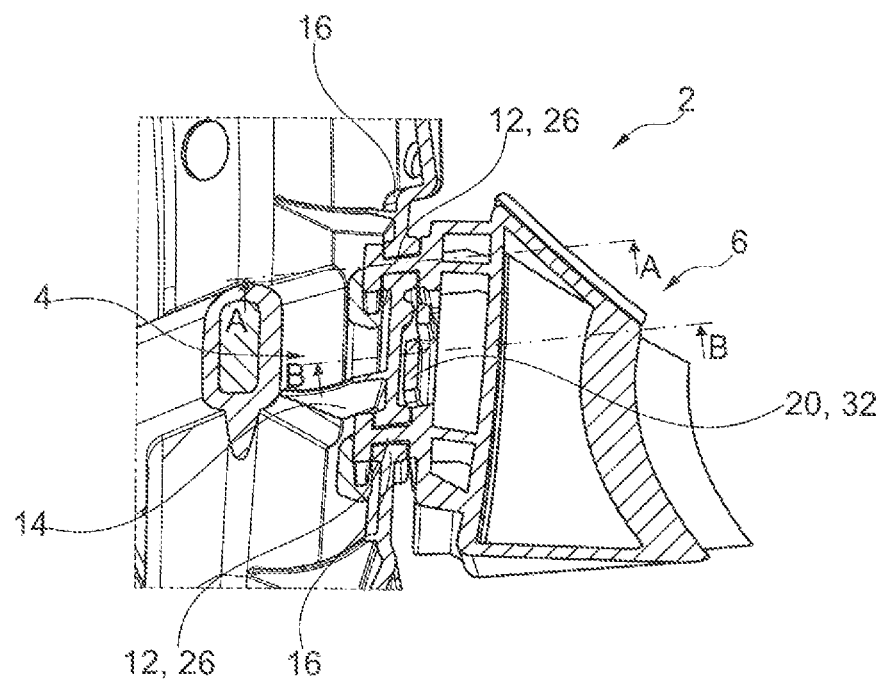
FIG. 4 shows a top view in section onto the spoiler arrangement according to FIG. 3.

FIG. 4 shows a section through the example embodiment according to FIG. 3. It can be seen with the aid of FIG. 4 that the first guide element 14 includes a projection section 26, having a double-T-shaped cross-section, which is constructed such that it engages on both sides behind the second guide element 16, constructed in the manner of a rail, transversely to the transfer direction 18.

Figure 5:
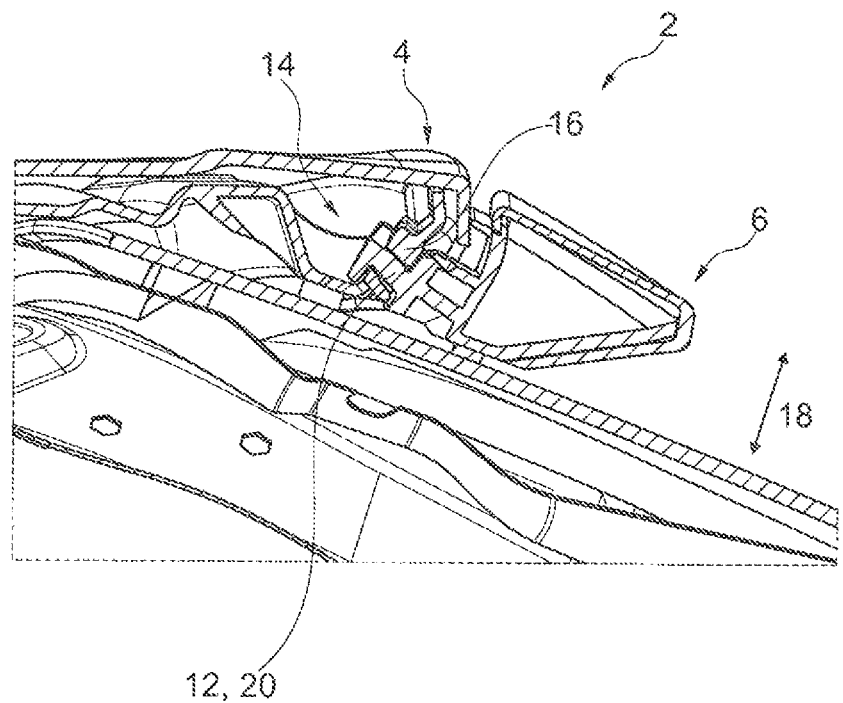
FIG. 5 shows a partial view in section along the ling A-A according to FIG. 4.

FIG. 5 shows a section along the line A-A according to FIG. 4. It can be seen from FIG. 5 that an adjusting element 25 is constructed on the first guide element 14 for adjusting an angle of inclination of the directing body 8 with respect to the base body 4. The adjusting element 28 is realized here by a surface shaping of the first guide element 12.

Figure 6:
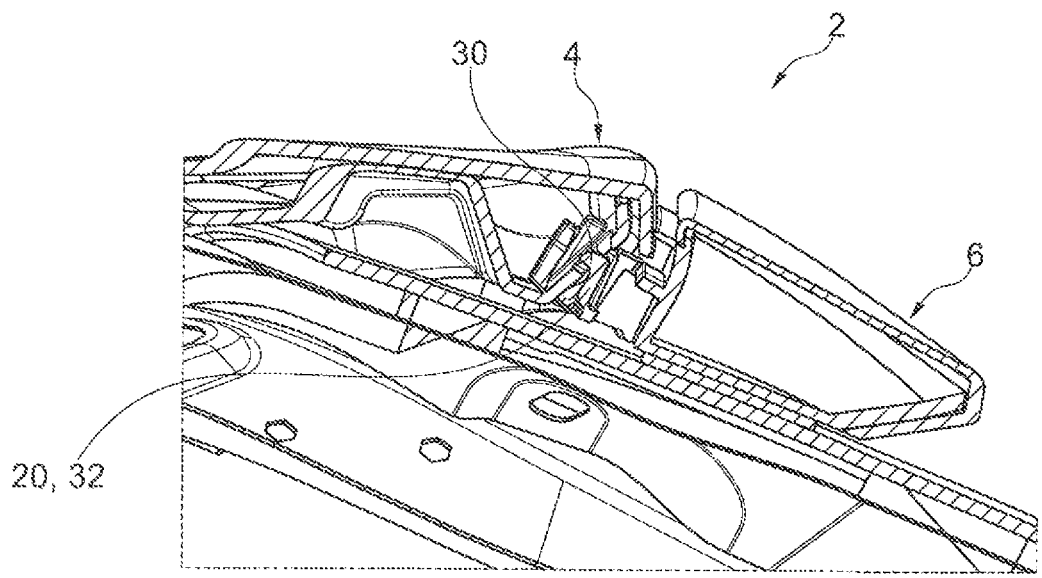
FIG. 6 shows a side view in section along the line B-B according to FIG. 4.

FIG. 6 shows a side sectional view along the section line B-B according to FIG. 4. It becomes clear from FIG. 6 that the securing element 20 includes a detent section 30, which engages at least in the locking position into the recess 24 of the base body 4 and includes a holding section 32, with which the detent section 30 forms an L-shaped cross-section and which is secured on the directing body 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An aerodynamically effective spoiler extension for a spoiler arrangement having a base body, the spoiler extension comprising:
    an extension body having at least one surface for changing the flow behavior of air flowing over the extension body;
    a guide arrangement including:
        a first guide element extending from the extension body, wherein a transfer of the spoiler extension along at least one transfer direction guides the first guide element from a release position in which the spoiler extension is removable from the base body into a locking position in which the spoiler extension is securable to the base body; and
        a securing element extending from the extension body and configured to automatically secure the spoiler extension on the base body in the locking position,
    wherein the guide arrangement further comprises an adjusting element for adjusting an angle of inclination of the extension body with respect to the base body.

2. The spoiler extension according to claim 1, wherein the guide arrangement further comprises a second guide element configured to extend from the base body and constructed in a corresponding complementary manner to the first guide element, the first guide element having a projection section formed transversely to the transfer direction and with which the second guide element is able to be engaged behind.

3. The spoiler extension according to claim 2, wherein the projection section comprises one of a T-shaped or double-T-shaped cross-section.

4. The spoiler extension according to claim 1, wherein the first guide element and the extension body comprise a shared component.

5. The spoiler extension according to claim 1, wherein the guide arrangement further comprises a clamping element extending from the extension body and configured to impart a clamping force at least partially transverse to the transfer direction between base body and extension body.

6. The spoiler extension according to claim 1, wherein the adjusting element comprises a surface shaping including a section inclined with respect to the transfer direction formed on the first guide element.

7. The spoiler extension according to claim 1 wherein the guide arrangement further comprises a securing element having a detent section extended at least partially transverse to the transfer direction, wherein the detent section is configured to be displaced on transfer from the release position and wherein upon reaching the locking position is configured to automatically engage behind a recess in the base body transversely to the transfer direction.

8. The spoiler extension according to claim 7, wherein the securing element comprises a flexible holding section prestressed into the locking position, at one end of which the detent section is arranged in order to form an L-shaped cross-section with a holding section, and which is able to be secured by an end on the extension body.

9. The spoiler extension according to claim 1, wherein the guide arrangement further comprises at least two first guide elements extending parallel to one another, and at least one securing element arranged between the at least two first guide elements, and at least one clamping means arranged between the securing element and the at least two first guide elements.

10. The spoiler extension according to claim 1, wherein the guide arrangement further comprises:
    a second guide element configured to extend from the base body and constructed in a corresponding complementary manner to the first guide element, the first guide element having a projection section formed transversely to the transfer direction and with which the second guide element is able to be engaged behind; and
    a clamping element extending from the extension body and configured to impart a clamping force at least partially transverse to the transfer direction between base body and extension body,
    wherein the adjusting element comprises a surface shaping including a section inclined with respect to the transfer direction formed on at least one of the first guide element, the second guide element and the clamping element.

11. A rear spoiler arrangement for a motor vehicle comprising a base body configured to be arranged on a motor vehicle, the rear spoiler arrangement having at least one aerodynamically effective spoiler extension according to claim 1, wherein transfer of the spoiler extension is guided from a release position, in which the spoiler extension is detached from the base body, along a transfer direction into a locking position, in which the spoiler extension is secured on the base body, the spoiler extension having at least one securing element, by which the extension body is secured automatically on the base body in the locking position.

12. A motor vehicle comprising the spoiler arrangement according to claim 11.

13. A rear spoiler arrangement for a motor vehicle comprising:
a base body configured to be arranged on a motor vehicle;
at least one aerodynamically effective spoiler extension including:
an extension body having at least one surface for changing the flow behavior of air flowing over the extension body;
a guide arrangement including a first guide element extending from the extension body, and a transfer of the spoiler extension along at least one transfer direction guides the first guide element from a release position in which the spoiler extension is removable from the base body into a locking position in which the spoiler extension is securable to the base body;
a securing element extending from the extension body and configured to automatically secure the spoiler extension on the base body in the locking position; and
at least one adjusting element for adjusting an angle of inclination of the extension body with respect to the base body, the adjusting element including a surface shaping having an inclined section with respect to the transfer direction.

14. The spoiler arrangement according to claim 13, wherein the guide arrangement further comprises a second guide element constructed in a complementary manner to the first guide element and arranged on the base body, and which is engages behind by the first guide element transversely to the transfer direction in the locking position.

15. The spoiler arrangement according to claim 13 wherein the securing element of the spoiler extension is configured to be received in a recess formed in the base body in the locking position.

16. The spoiler arrangement according to claim 13, wherein the guide arrangement comprises at least two second guide elements extended substantially parallel to one another and with the recess arranged between at least the two guide elements.

* * * * *